United States Patent
Foresman (12)

(10) Patent No.: US 6,568,653 B1
(45) Date of Patent: May 27, 2003

(54) BUTTERFLY VALVE ACTUATION SYSTEM FOR PORTED KILN

(75) Inventor: James D. Foresman, Hughesville, PA (US)

(73) Assignee: Metso Minerals Industries, Inc., Milwaukee, WI (US)

( * ) Notice: Subject to any disclaimer, the term of this patent is extended or adjusted under 35 U.S.C. 154(b) by 0 days.

(21) Appl. No.: 10/053,196

(22) Filed: Jan. 15, 2002

(51) Int. Cl.⁷ ................................................ F16K 31/44
(52) U.S. Cl. ........................................................ 251/78
(58) Field of Search ...................................... 251/77–83

(56) References Cited

U.S. PATENT DOCUMENTS

| | | | |
|---|---|---|---|
| 3,794,483 A | 2/1974 | Rossi | 75/91 |
| 3,847,538 A | 11/1974 | Rossi | 432/113 |
| 3,945,624 A | 3/1976 | Rossi | 266/20 |
| 4,070,149 A | 1/1978 | Rossi | 432/109 |
| 4,148,601 A | 4/1979 | Kulabukhov et al. | 432/109 |
| 4,155,704 A | 5/1979 | Kulabukhov et al. | 432/105 |
| 4,208,181 A | 6/1980 | Rossi | 432/109 |
| 4,209,292 A | 6/1980 | Rossi | 432/105 |
| 4,345,896 A | 8/1982 | Abernathy, Jr. et al. | 432/19 |
| 5,560,591 A * | 10/1996 | Trudeau et al. | 251/80 |
| 6,095,485 A * | 8/2000 | Lebkuchner et al. | 251/77 |
| 6,170,801 B1 * | 1/2001 | Powell et al. | 251/71 |
| 6,183,242 B1 | 2/2001 | Heian | 432/11 |
| 6,216,737 B1 | 4/2001 | Taylor et al. | 137/875 |

* cited by examiner

Primary Examiner—Paul J. Hirsch
(74) Attorney, Agent, or Firm—Andrus, Sceales, Starke & Sawall, LLP (57) ABSTRACT

A method and apparatus for supplying air to a ported rotary kiln involves the use of butterfly valves and a mechanical valve actuation system for introducing air into the kiln at axially and circumferentially spaced locations along the kiln length. The valve actuation system selectively and sequentially opens and closes the butterfly valves such that port air is introduced into the interior of the rotary kiln. The valve actuation system of the present invention is incorporated with a butterfly valve having a valve housing with an air passageway and including an air inlet and an air outlet, a valve disc rotatable within the housing to open and close the passageway, and a valve stem defining an axis of rotation and connected to the valve member for rotation therewith. The valve actuation system includes an assembly mounted on the valve stem to rotate the valve member between its open and closed positions. The valve actuator assembly includes an actuator base connected to the valve stem for rotation therewith, a lever assembly mounted coaxially with the actuator base and valve stem to freely rotate relative to the actuator base and valve stem, and a lost motion mechanism interconnecting the actuator base and the lever assembly for transferring torque from the lever assembly to the actuator base as the lever assembly rotates.

11 Claims, 9 Drawing Sheets

BUTTERFLY VALVE ACTUATION SYSTEM FOR PORTED KILN

BACKGROUND OF THE INVENTION

The present invention relates to ported rotary kilns used, for example, in the reduction of iron ore, and more particularly to a butterfly valve actuation system for introducing air into the kiln at axially and circumferentially spaced locations along the kiln length.

One way to enhance the operation and increase the capacity of rotary kilns used in process plants is to inject air into the kiln from ports passing through the kiln shell. In this manner the pattern of the ports through the kiln shell can be designed to optimize the process. Depending on the process, air can be injected into the kiln above the product bed and the airflow is then shut off underneath the bed; or air can be added underneath the bed and airflow is then shut off above the product bed. In either case, there has to be a method to open and close butterfly valves mounted on a manifold attached to the kiln shell. The actuation of these valves also must be done in proper sequence.

The manner in which air is added to the kiln through ports passing through the kiln shell is typically accomplished as follows. A two-piece manifold surrounds the kiln. The outer segment of the manifold is stationary and is supported by structural members on each side. The inner segment of the manifold is attached directly to the kiln shell by leaf springs. The inner segment rotates with the kiln. A large rubber lip seal is attached to the inner, rotating segment of the manifold. The lip of the lip seal rides against the face of the outer, stationary segment of the manifold. Attached tangentially to the outer segment is a duct that connects to an air fan. Positioned on the face of the inner segment are pipe sections with end flanges arranged in a circle around the kiln. Sandwiched between each flange and pipe extending along the length of the kiln shell are butterfly valves. These valves are opened and closed in a specific sequence as they rotate with the inner segment of the manifold to control the timing and amount of air entering the kiln. Examples of such systems can be found in U.S. Pat. Nos. 3,794,483; 3,847,538; 3,945,624; 4,070,149; 4,208,181 and 4,209,292.

The interior of the kiln is heated to temperatures as high as 2,600° F. The kiln shell is refractory lined to insulate the shell from the heat. However the kiln shell temperature can get as high as 700° F. in some cases. Any valve actuation device has to rotate with the kiln, is subjected to high shell temperatures and harsh, dusty environments. Consequently it is difficult to use hydraulic, pneumatic or electric actuators in this application. The most reliable way to actuate the valves is through a type of a mechanical mechanism.

Using fully seated valves poses some design challenges in this application. Any type of a mechanical mechanism has to provide the necessary seating torque for the valve in a very limited distance. A typical butterfly valve with flexible seats has about a ¼-degree of rotation from the beginning of the disc seating to when the mechanical stop is reached. If the forces applied to the valve to create the opening and closing torque are applied beyond the limited seating travel of the valve disc, then parts of the valve itself and/or the valve actuation mechanism will be subjected to high stresses and the possibility of part failure or jamming of the valve exists.

In order to convey material along the length of a kiln, kilns are installed with a slight slope. Material is fed into the kiln by gravity and gravity causes the material to transverse the kiln as it rotates. As the kiln rotates, frictional effects of the material particles and interior surface of the kiln causes the material bed to take an angular position off center on the up turning side of the kiln. The center of gravity of the material bed is then displaced from the kiln centerline. As a result, the weight of the material bed applies a moment about the kiln centerline. If power is lost to the kiln drive, this material bed moment will cause the kiln to have a reverse rotation, referred to as "kiln rollback." Under certain conditions there can be a build up of material that sticks to the inner surface of the kiln and is not symmetrical with the kiln. If power is lost when a material unbalance is at the top of the kiln, the kiln can rollback as much as 300 degrees. A valve actuation mechanism has to be able to have some means to accommodate this change in direction or rollback without damaging any valve or kiln parts or requiring re-setting of components.

In order to maximize the air porting and thus the airflow into a kiln, the piping arrangement used with a kiln can become quite congested. Therefore, it is beneficial to keep the space requirements of the valve actuation system to a minimum so that the number of ports can be maximized and optimally positioned based on process requirements.

The valve actuation mechanism must meet the following criteria:

1. The valves must open and close in a specific sequence and at specific points in kiln rotation.
2. The mechanism must produce the necessary torque to the valve stem to completely seat the valve.
3. The mechanism must not apply a torque to the valve stem greater than maximum value recommended by the valve manufacturer.
4. The assembly must have flexibility built into it to allow for installation misalignment and tolerance build-up of parts that could cause the mechanism to move beyond the limited travel required to seat the valve.
5. The assembly must be adjustable to allow for part wear, particularly the cam track.
6. There must be angular adjustment of the valve trippers relative to the kiln cross section that enables adjusting the points where the valves open and close.
7. The actuation assembly must be able to accommodate kiln rollback without damaging any components, altering the opening and closing sequence or requiring any re-setting.
8. Due to the congested piping assembly on the kiln, the valve actuation assembly must use a minimum of space.

SUMMARY OF THE INVENTION

In accordance with the present invention, there is provided an improved method and apparatus for supplying air to a ported rotary kiln. The improved method and apparatus involves the use of a mechanical butterfly valve and valve actuation system for introducing air into the kiln at axially and circumferentially spaced locations along the kiln length. The valve actuation system selectively and sequentially opens and closes the butterfly valves such that port air is introduced into the interior of the rotary kiln either above or beneath the product bed contained within the kiln as the kiln rotates. The valve actuation system of the present invention meets all of the criteria referred to above.

The valve actuation system of the present invention is incorporated with a butterfly valve comprising a valve housing having an air passageway including an air inlet and an air outlet, a valve member rotatable within the housing to open and close the passageway, and a valve stem defining an axis of rotation and connected to the valve member for rotation therewith. The valve actuation system includes an assembly mounted on the valve stem to rotate the valve member between its open and closed positions. The valve actuator assembly includes an actuator base connected to the valve stem for rotation therewith, a lever assembly mounted coaxially with the actuator base and valve stem to freely rotate relative to the actuator base and valve stem, and a lost motion mechanism interconnecting the actuator base and the lever assembly for transferring torque from the lever assembly to the actuator base as the lever assembly rotates. Preferably, the actuator base includes a hub positioned around the valve stem and a base plate projecting radially from the hub. Also, the lever assembly preferably includes a collar and a plurality of equi-angularly spaced lever arms projecting radially from the collar with each lever arm including a cam roller rotatably mounted on an axis parallel to and radially spaced from the axis of rotation of the valve stem. In the most preferred embodiment, there are four lever arms. Each disposed 90° with respect to each other and about the collar.

The lost motion mechanism comprises a pair of spring assemblies extending between the actuator base and the lever assembly. Each spring assembly includes a swing bolt having a shank, a pivot end and a free end with the pivot end being pivotally mounted on the actuator base about an axis parallel to the axis of rotation of the valve stem, and the free end being received within an opening formed in an arm of the lever assembly. In addition, each spring assembly includes a coil spring surrounding the shank which is slightly compressed so as to provide a desired amount of resistance to the rotation of the lever assembly relative to the actuator base.

As the kiln rotates, one of the cam rollers on the lever assembly comes in contact with a stationary cam track referred to as a tripper. The rotation of the kiln then causes the actuator assembly to rotate as the cam roller travels around the tripper track causing the valve to open. At the point of kiln rotation where the valve is to be closed, a second stationary tripper closes the butterfly valve by reversing its rotation. By having two independent components to the actuation mechanism, i.e. the actuator base and lever assembly, connected to one another by springs that enable "lost motion" to occur between the two components so that the lever assembly can rotate relative to the actuator base, sufficient flexibility can be built into the butterfly valve actuation system to accommodate the relatively small movement required to seal butterfly valves without over stressing the components thereof. This actuation system also applies sufficient torque to the valve to close it completely but further provides some allowance for misalignment, tolerances, wear and the like in parts. The present actuation system also accommodates kiln rollback without damaging any components, altering the opening and closing sequence, or requiring any resetting of the apparatus.

Various other features, objects and advantages of the invention will be made apparent from the description taken together with the drawings.

DESCRIPTION OF THE DRAWINGS

The drawings illustrate the best mode contemplated of carrying out the invention.

In the drawings:

FIG. 3b is a schematic end view of the valve actuation mechanism of FIG. 3a;

DETAILED DESCRIPTION OF THE INVENTION

Figure 1:
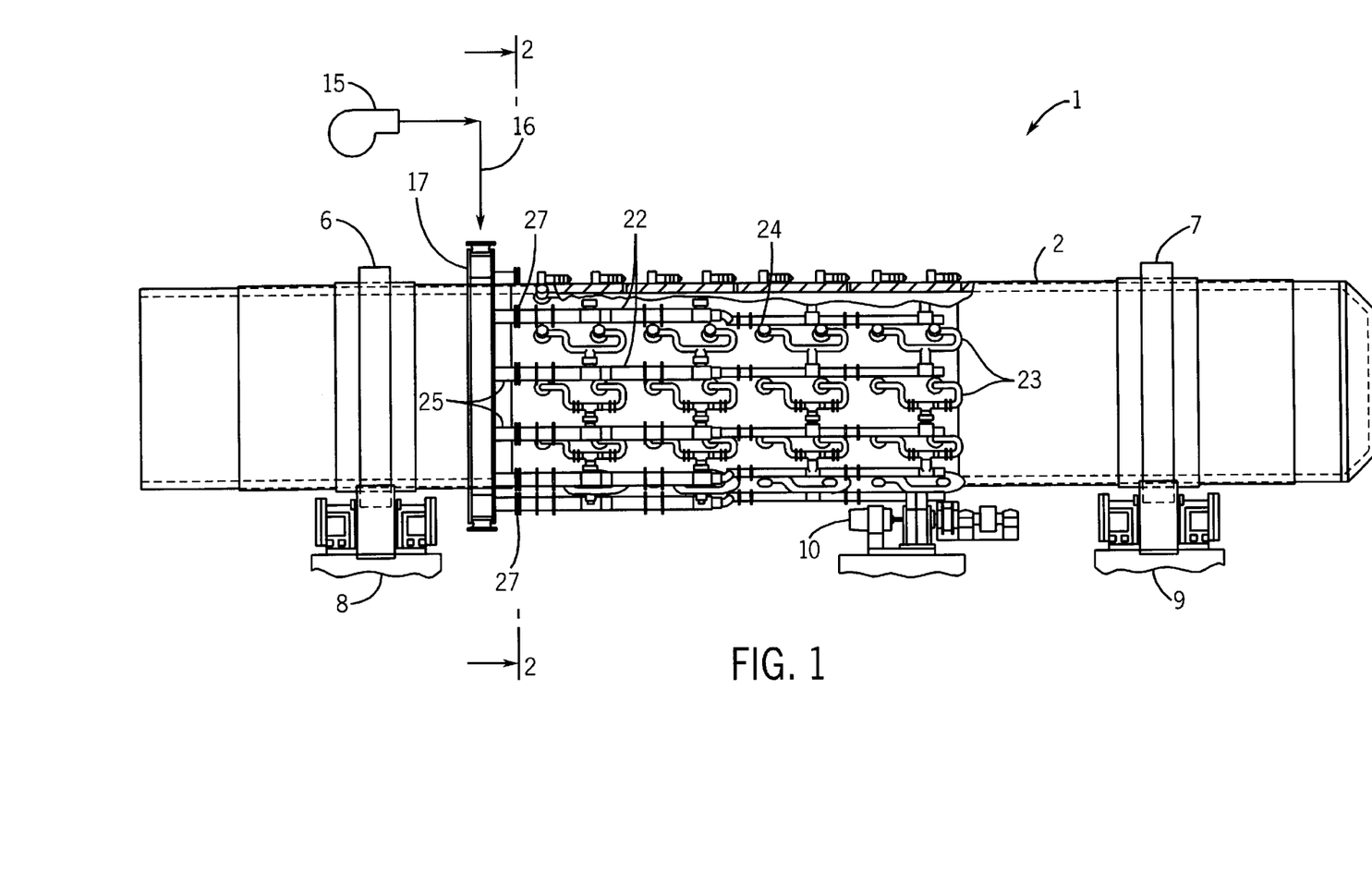
FIG. 1 is a schematic illustration of a rotary kiln illustrating the introduction of port air into the rotary kiln.

Referring now to the drawings, FIG. 1 illustrates a ported rotary kiln generally designated by the numeral 1 which incorporates a valve actuation mechanism constructed in accordance with the present invention. The rotary kiln 1 may be used for such purposes as reducing iron ore to a lower state of oxidation, and is typically part of a system that incorporates agglomerators, traveling grate dryers, pelletizers and the like to prepare pellets that are introduced as feed stock into one end thereof. There are numerous uses for rotary kilns and thus the use of terms such as "reduction" and/or "reducing" is not meant to be limiting and in fact refers to only one example of the many potential uses for kiln 1 with which the valve actuating mechanism of the present invention may be incorporated.

Figure 2:
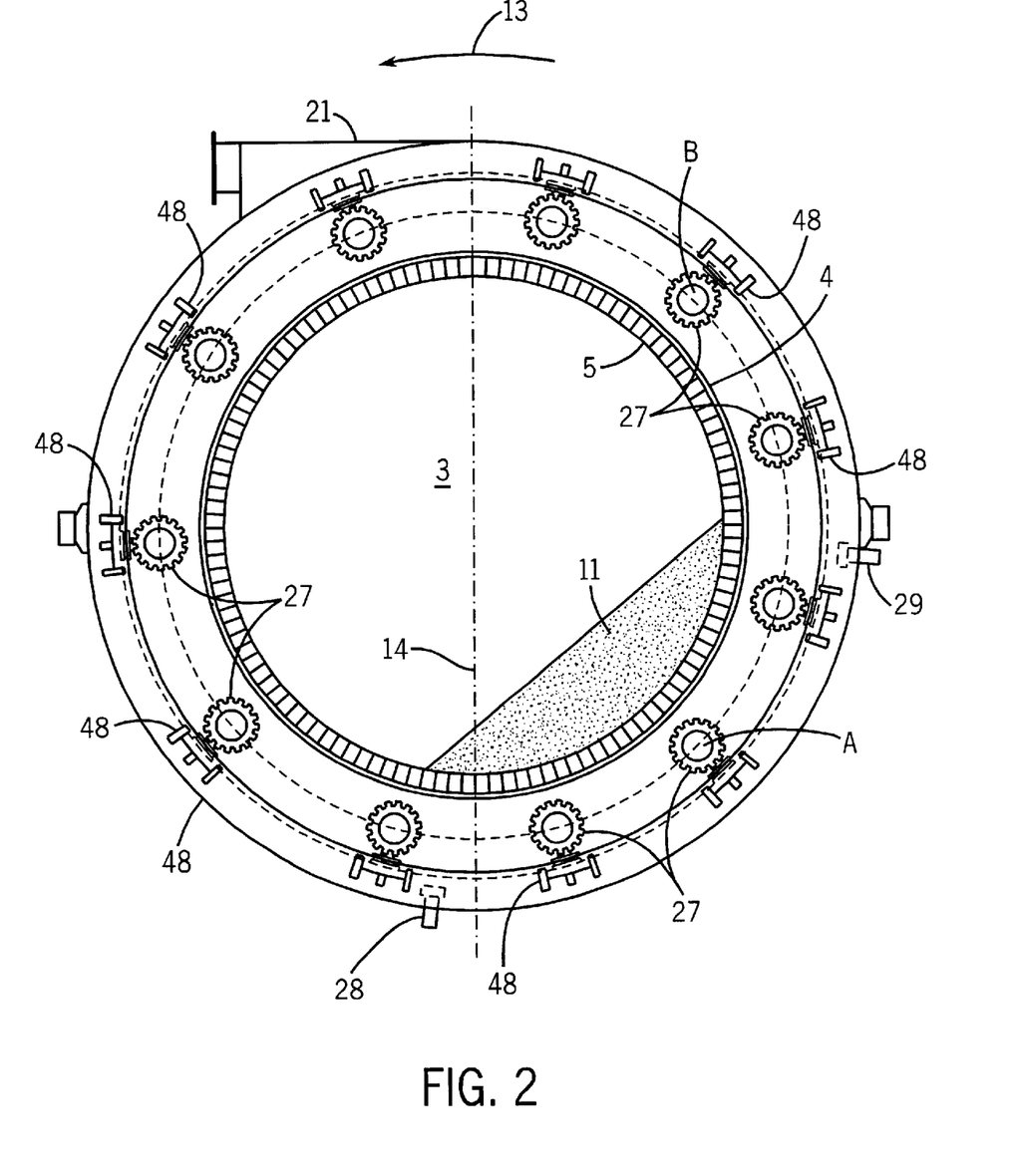
FIG. 2 is a cross-sectional schematic view through the rotary kiln of FIG. 1 illustrating the introduction of port air beneath the product bed contained within the kiln.

As illustrated, rotary kiln 1 comprises an elongated cylindrical body portion 2 which defines a cylindrical reduction or combustion chamber 3. The general arrangement and construction of rotary kilns of this type are well known to those skilled in the art and thus need not be described in detail. The shell or inner wall 4 (see FIG. 2) of kiln 1 may be lined with any suitable refractory material such as fire bricks 5. Any well known means may be provided for supporting and rotating kiln 1, and FIG. 1 schematically illustrates such an arrangement by illustrating a pair of riding rings 6 and 7 which ride on supports 8 and 9 respectively, and a motor 10 for rotating kiln 1. A charge of ore or other product generally designated by the numeral 11 is shown in FIG. 2, and since kiln 1 is inclined downwardly from right to left as shown in FIG. 1, the ore or product 11 slowly travels by gravity through the combustion chamber 3 as the cylindrical body 2 rotates. The ore or product 11 is generally fed into one end of rotary kiln 1, and external fuel is introduced through a burner (not shown) to heat the kiln. If desired, additional air may be introduced through an air lance (not shown) at the same end as the burner. Since the kiln 1 of this type is well known in the art and forms no part of the present invention, it is not illustrated or described in detail herein.

Port air is introduced or injected into the combustion chamber 3 of kiln 1 either above the product bed 11, or underneath bed 11, depending on the process and product being passed through kiln 1. In the embodiment shown, port air is being added underneath bed 11 while air flow is shut off above product bed 11, as in FIG. 2. FIG. 2 also shows that product bed 11 is displaced off center to the right as the kiln rotates in a counterclockwise direction, as illustrated by arrow 13. Thus, the center of gravity of the material bed 11 is displaced to the right of the kiln centerline designated by 14. As a result, the weight of material bed 11 applies a moment about the kiln centerline 14 so that if power is lost to the kiln drive, the moment created by material bed 11 will cause kiln 1 to have a reverse rotation, i.e. a clockwise rotation, referred to as kiln rollback. As previously noted, the kiln 1 can rollback as much as 300°. The valve actuation assembly hereinafter to be described is able to accommodate not only normal kiln rotation in the counterclockwise direction, but also kiln rollback in a clockwise direction without damaging any components, altering the opening and closing sequence or requiring any resetting of components.

Port air is introduced or injected into rotary kiln 1 by a port air fan 15 supplying air through an air passageway 16 to a two-piece manifold 17 that extends around the outer circumference of body 2 of kiln 1. Manifold 17 includes an outer segment 18 which is stationary and is supported by structural members (not shown) on each side. Manifold 17 also includes an inner segment 19 attached directly to the kiln shell 4 by leaf springs (not shown). The inner segment 19 rotates with kiln 1 and includes a rubber lip seal 20 which rides against a face of the outer, stationary segment 18 of manifold 17. An inlet duct 21 is attached tangentially to outer segment 18 and connects manifold 17 to passageway 16 and port air fan 15. A series of port air conduits 22 are spaced around the outer circumference of shell 4 of kiln 1. Each port air conduit 22 extends parallel to the longitudinal length of kiln 1 and is coupled to manifold 17 such that air from port air fan 15 can flow through air passageway 16, through manifold 17 and into the port air conduits 22. Typically, either eight or twelve individual port air conduits 22 can be spaced around the outer circumference of kiln 1. Each port air conduit 22 also includes a plurality of distribution pipes 23 which lead to a plurality of ports 24 that extend into the interior of kiln 1 through shell 4. As is well known, each port 24 extends through outer shell 4 and refractory lining 5 to enable air to be introduced or injected into combustion chamber 3.

Positioned on the inner face of inner segment 19 of manifold 17 are a plurality of short pipe sections 25 with each including an end flange 26 that are spaced around the outer circumference of shell 4 of kiln 1. The number and location of each pipe section 25 matches the number and location of each port air conduit 22. Sandwiched between each flange 26 and port air conduit 22 is a butterfly valve sometimes referred to as a tipper valve 27. Valves 27 are opened and closed in a specific sequence as they rotate with the inner segment 19 of manifold 17 to control the timing and amount of air entering combustion chamber 3 of kiln 1.

Referring again to FIG. 2, the valve 27 for each port air conduit 22 is configured to open when each of the ports 24 is beneath the bed 11 of material contained within kiln 1. As kiln 1 rotates in the direction shown by arrow 13, each valve 27 is opened by a valve tripper 28 which is located just to the left of kiln centerline 14. When valve 27 opens, ports 24 associated therewith are located beneath the bed 11. As kiln 1 continues to rotate in the direction of arrow 13, a second valve tripper 29 closes valve 27 at a location slightly less than 90° with respect to kiln centerline 14. In the embodiment illustrated, each valve 27 opens at approximately 170° and closes at approximately 260° when measured in a counterclockwise direction. In this manner, port air flows into the combustion chamber 3 of kiln 1 only when each of the ports 24 is beneath the bed 11 of feedstock.

Although the supply of port air is illustrated as being introduced in a single zone of kiln 1, it should be understood that two or more separate port air zones could be formed along the longitudinal length of kiln 1. For example, a pair of port air zones may be necessitated due to the location of one or more kiln riding rings. Also, it should be understood that although FIG. 2 illustrates the injection of port air into the kiln underneath bed 11 (reference A designating valve 27 is open) with the port air flow shut off above product bed 11 (reference B designating valve 27 is closed), it is also possible, depending on the process, to introduce or inject air into the kiln above product bed 11 with air flow shut off underneath bed 11 by simply using valve tripper 29 as the opening valve tripper rather than the closing valve tripper. Likewise, valve tripper 28 would then be the closing valve tripper rather than the opening valve tripper.

Figure 3A:
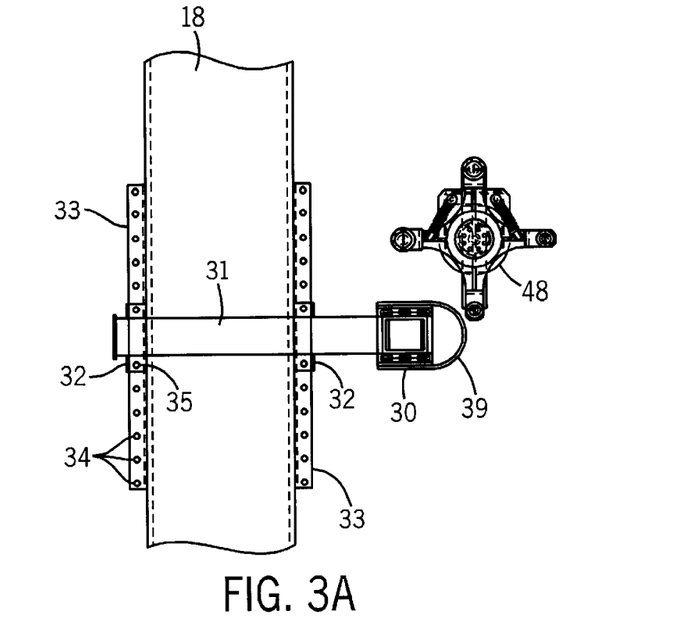
FIG. 3a is a schematic top view illustrating the valve actuation mechanism of the present invention.
Figure 3B:
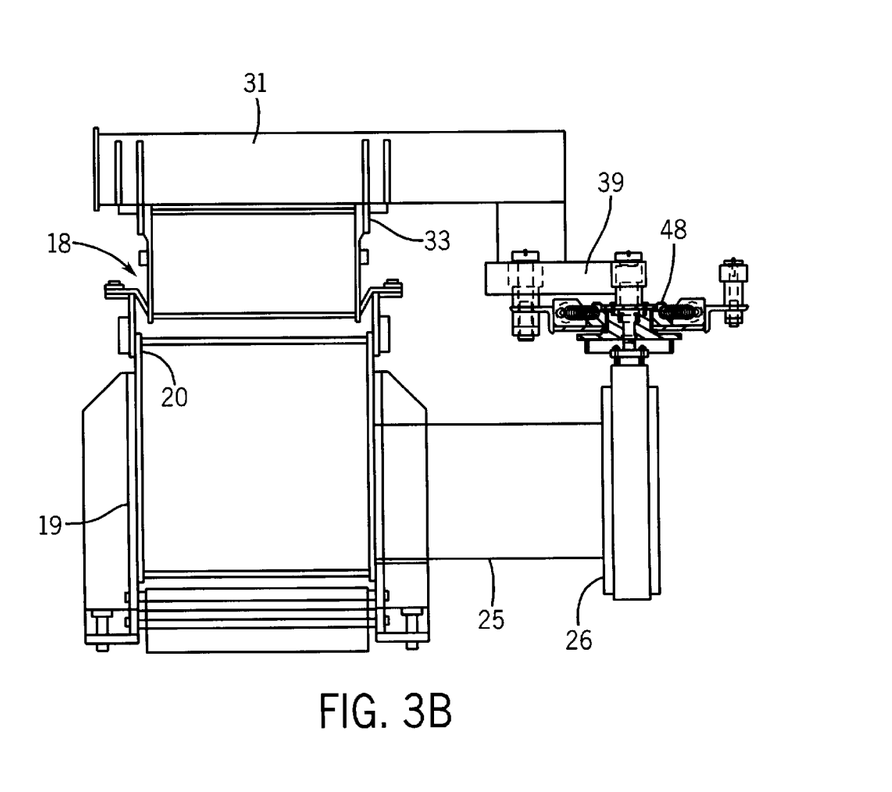
Figure 4:
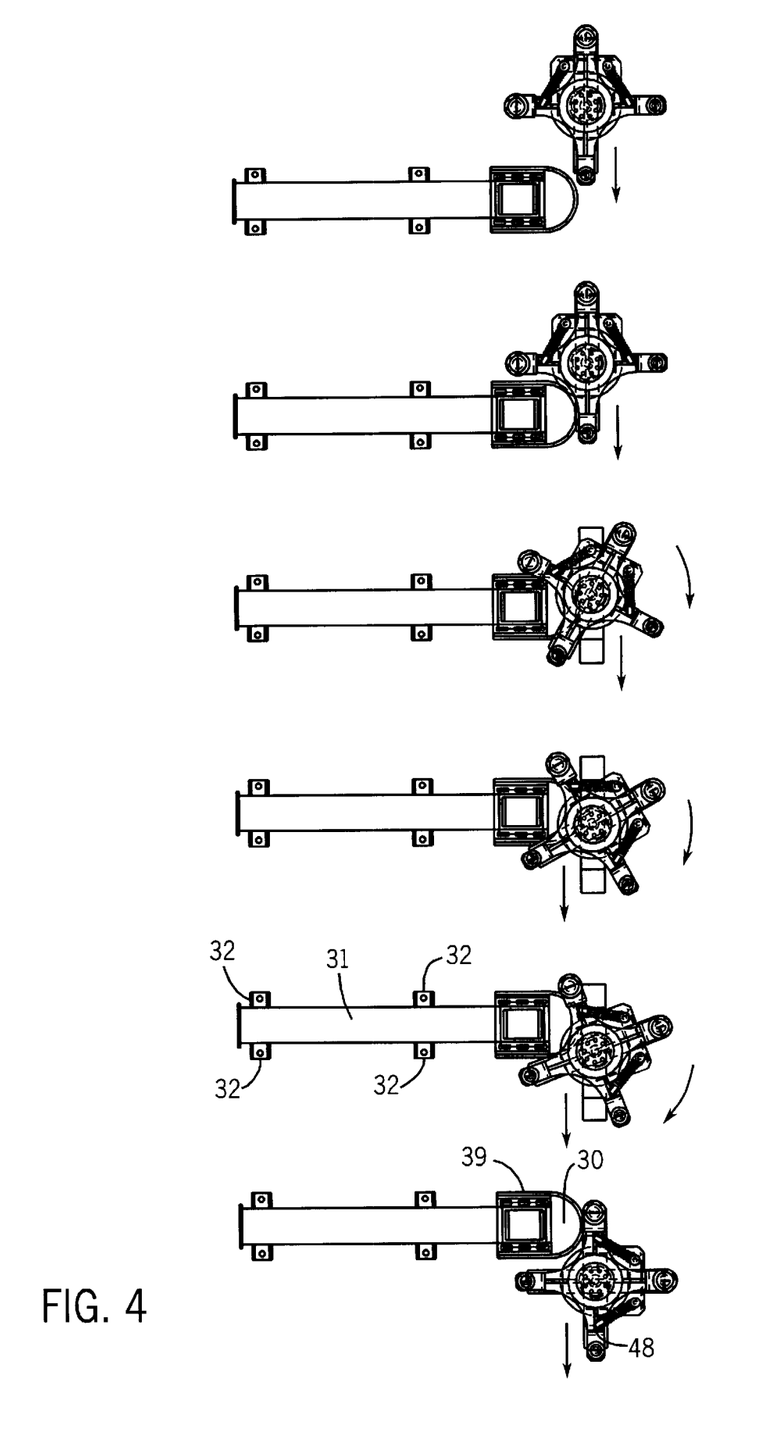
FIG. 4 is a schematic view illustrating the operation of the valve actuation mechanism to open a butterfly valve.

Referring now to FIGS. 3a, 3b and 4, the opening valve tripper 28 is attached to the stationary outer segment 18 of manifold 17 and includes a head or tripper track 30 mounted on the end of an arm 31. Arm 31 in turn is mounted to the stationary outer segment 18 by four flanges 32 and a corresponding pair of L-shaped brackets 33 mounted on outer segment 18. Each bracket 33 includes a plurality of openings 34 formed therethrough which are aligned with corresponding openings in flanges 32 to receive bolts 35 to securely mount tripper 28. The circumferential position of head 30 of tripper 28 can be adjusted by removing bolts 35 and repositioning arm 31 and flanges 32 upwardly or downwardly to align the openings in flanges 32 with a different series of openings 34 in brackets 33 either upwardly or downwardly as illustrated in FIG. 3a.

Figure 5:
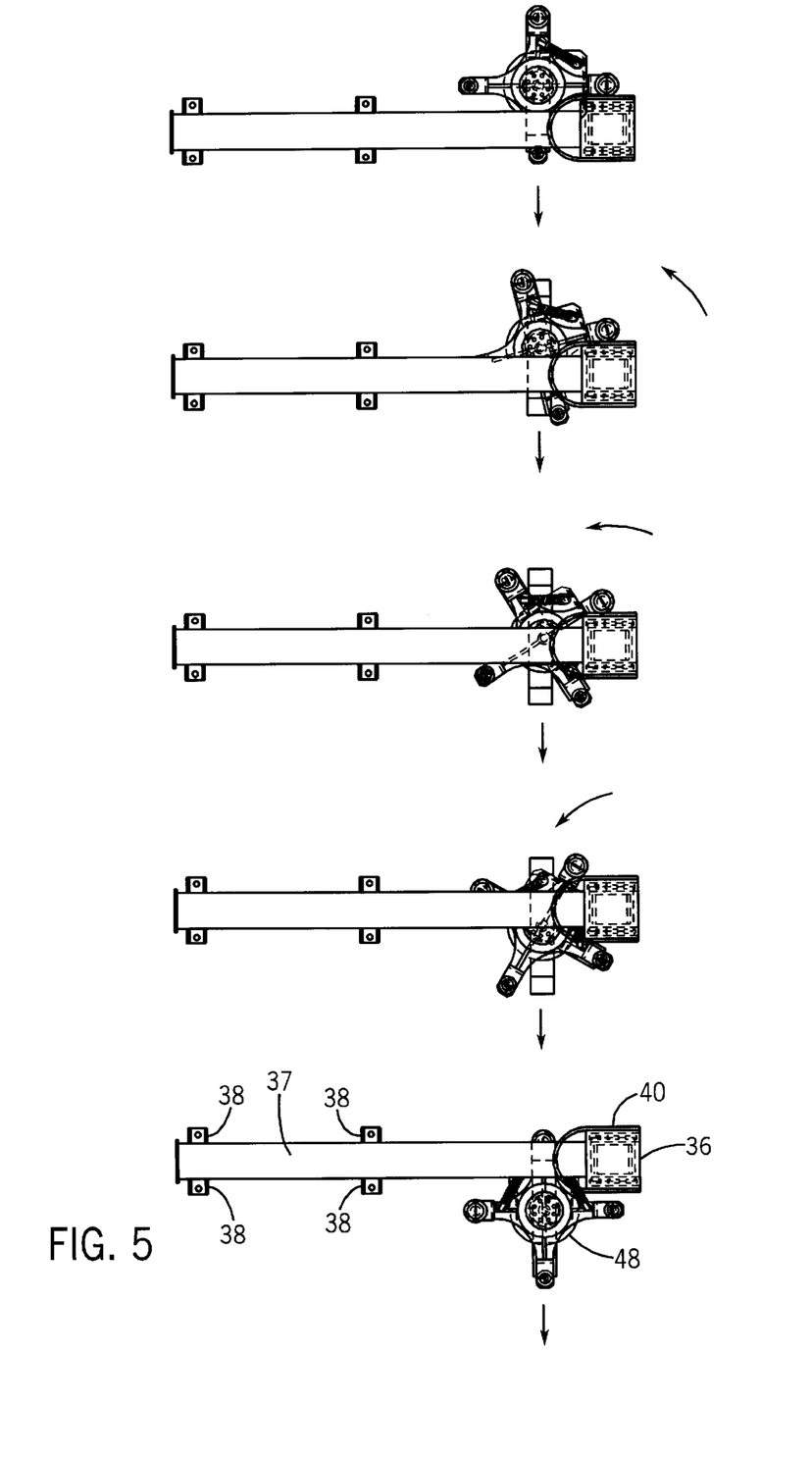
FIG. 5 is a schematic view illustrating the operation of the valve actuation mechanism to close a butterfly valve.
Figure 6:
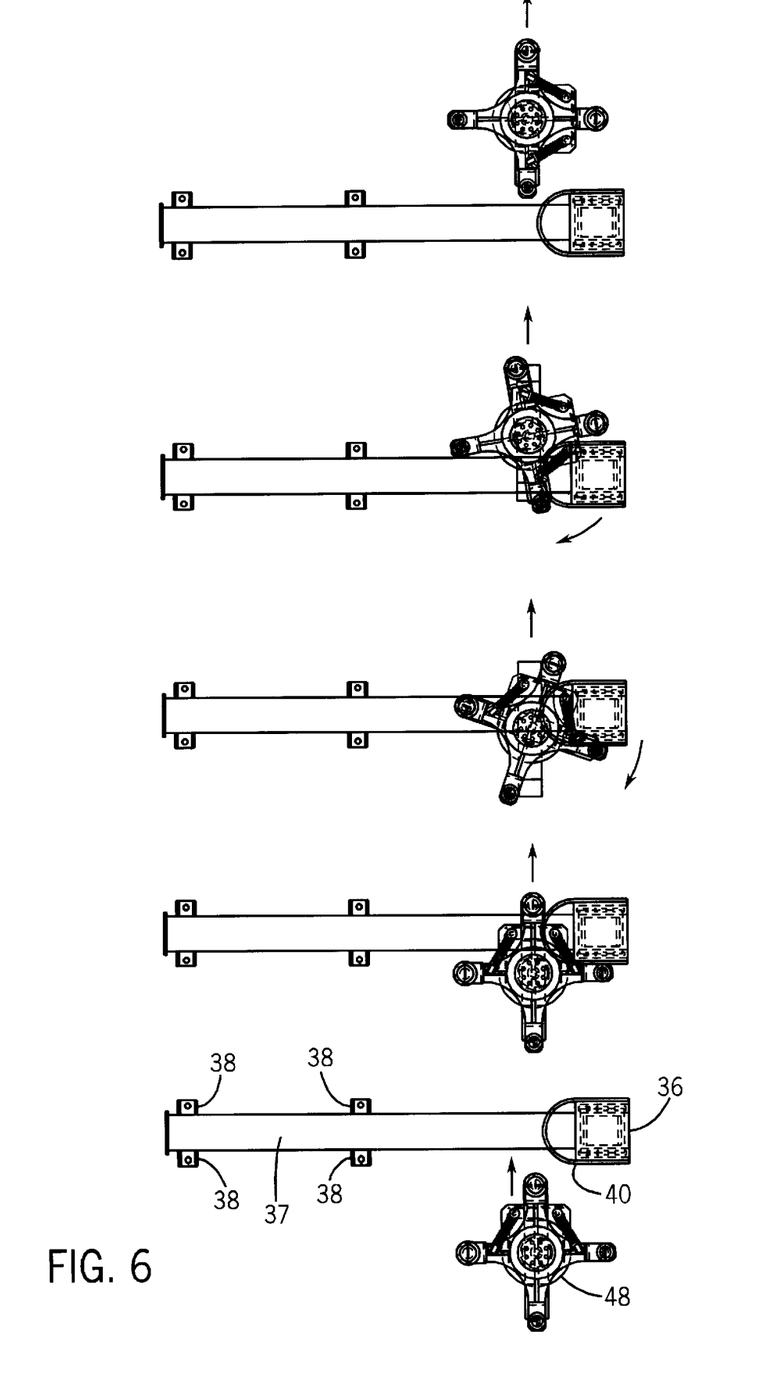
FIG. 6 is a schematic view illustrating the operation of the valve actuation mechanism during kiln rollback.
Figure 7:
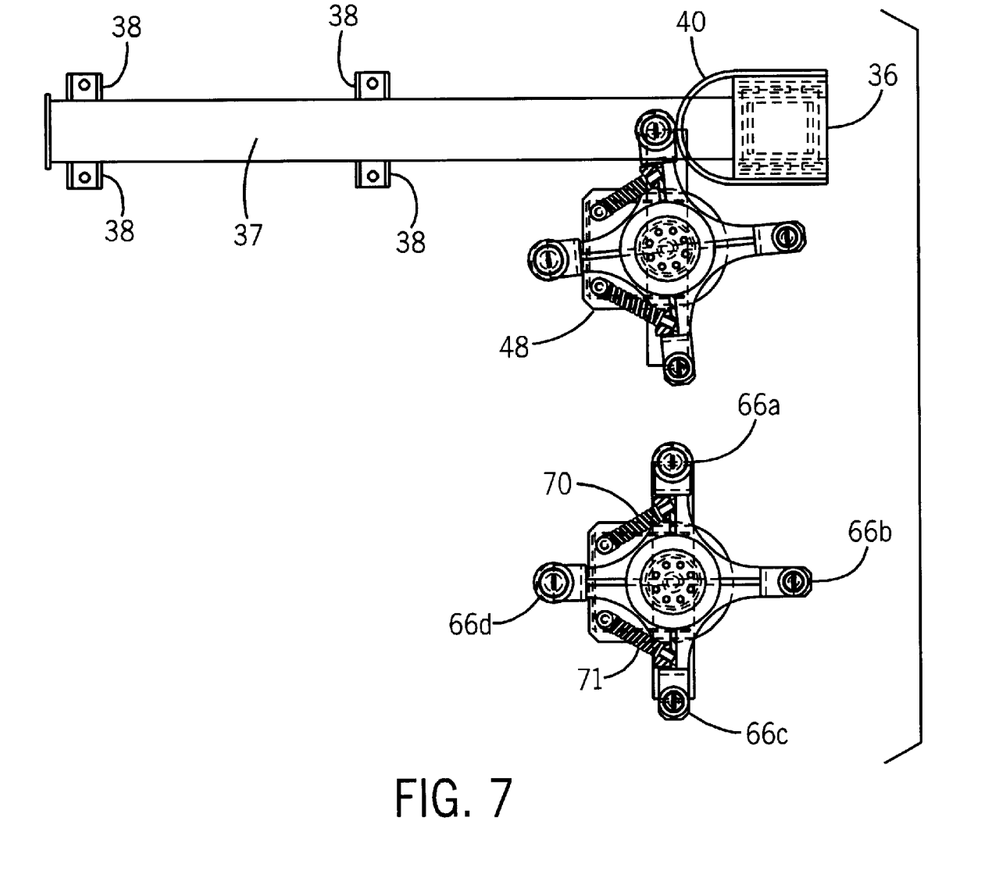
FIG. 7 is a schematic view illustrating the lost motion of the valve actuation mechanism.

The closing valve tripper 29 is best illustrated in FIGS. 5–7. The closing valve tripper 29 likewise has a head or tripper track 36 mounted on the end of an arm 37, and is mounted to the stationary outer segment 18 via flanges 38 in the same manner as described with respect to the opening valve tripper 28. The closing valve tripper 29 may likewise also be adjusted circumferentially in the same manner as described with respect to the opening valve tripper 28. The position of the head or tripper track 36, however, is different for the closing valve tripper valve 29 than for the. opening valve tripper 28. As shown in FIGS. 5–7, the head or tripper track 36 of the closing valve tripper 29 extends axially from outer segment 18 of manifold 17 past the butterfly valve 27 so as to contact the actuator lever arms thereof on the opposite side as compared to the opening valve tripper 28, as will hereinafter be described (see FIG. 4 versus FIG. 5). In addition, FIGS. 5–7 illustrate the head or tripper track 36 of the closing valve tripper 29 is reversed from that of head or tripper track 30. Thus, the profile or cam track 39 of the head or tripper track 30 for the opening valve tripper 28 extends in a direction away from stationary outer segment 18 of manifold 17 whereas the profile or cam track 40 of the head or tripper track 36 for the closing valve tripper 29 projects in the reverse direction toward outer segment 18 of manifold 17.

Figure 9:
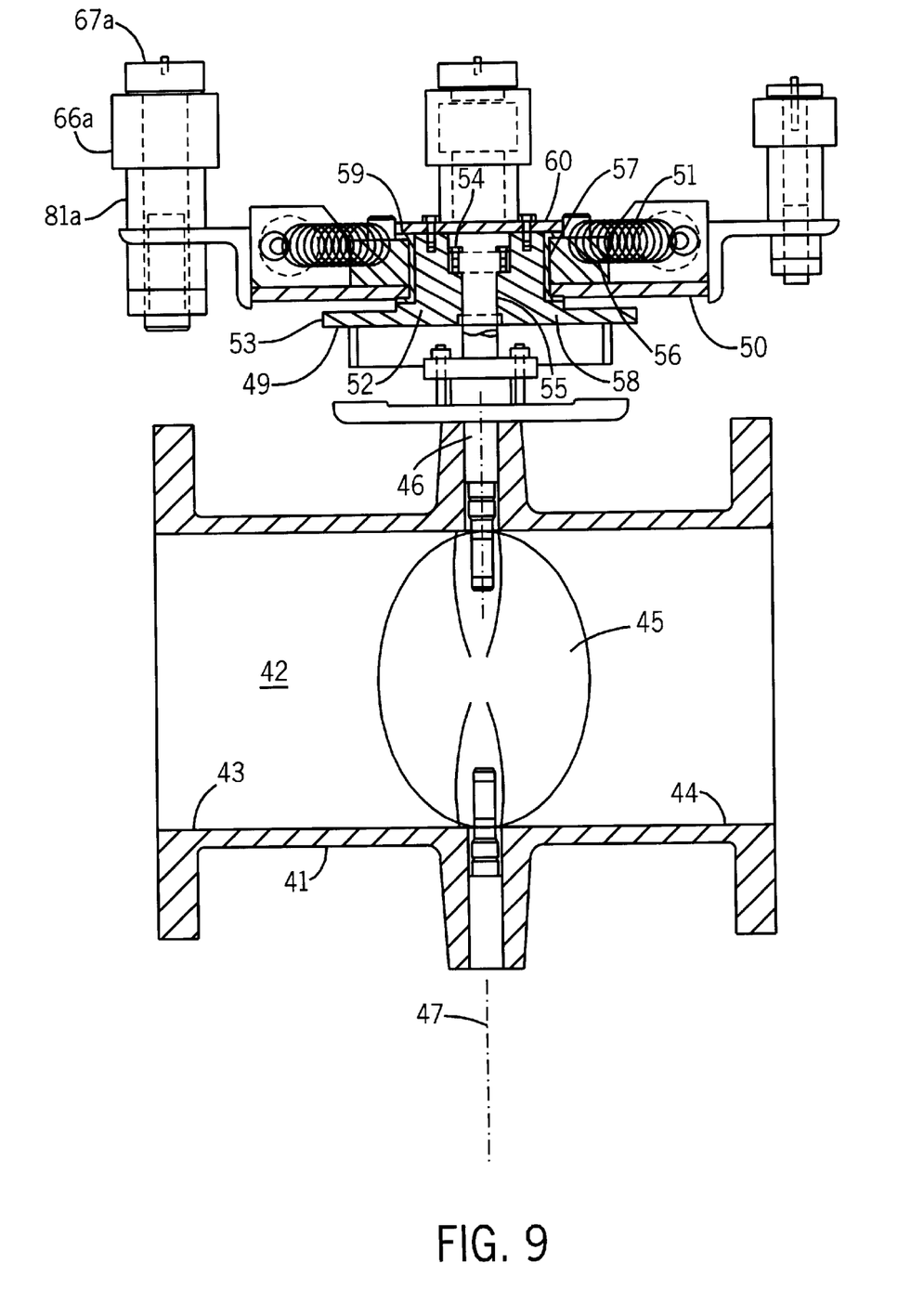
FIG. 9 is a cross-sectional view of the valve actuation mechanism taken along the line 9—9 in FIG. 8 with the butterfly valve shown schematically in cross-section.

As shown schematically in FIG. 9, each butterfly valve 27 includes a valve housing 41 which defines an air passageway 42 including an air inlet 43 and an air outlet 44 interconnected with the port air conduits 22 on body 2 and short pipe sections 25 extending from inner segment 19 of manifold 17. Also illustrated in FIG. 9 is valve member or valve disc 45 which is rotatable within housing 41 to open and close the air passageway 42 in a conventional manner. A valve stem 46 defining an axis of rotation 47 is connected to valve disc 45 for rotation therewith, and is used to operate or move disc 45 between its open and closed positions. As previously noted herein, each valve 27 is identical in design. Further, although illustrated and described herein as a butterfly valve, each valve 27 may be of other designs so long as the valve functions to regulate the flow of air from manifold 17 through port air conduits 22. Thus, different types of valves such as ball valves, swing check valves, lift check valves, and the like may be utilized depending upon process conditions and the kiln used.

The valve actuation mechanism of the present invention comprises two major assemblies. First, there is the stationary cam tracks 39 and 40 of the opening valve tripper 28 and the closing valve tripper 29 that are attached to the stationary outer segment 18 of manifold 17. Secondly, there is a spring loaded actuator assembly generally designated by the numeral 48 mounted on each valve stem 46 of valves 27 to rotate the valve disc 45 thereof. The valve actuator assembly comprises three main components. First, an actuator base 49 is connected to the valve stem 46 for rotation therewith. Second, a lever assembly generally designated by the numeral 50 is mounted coaxially with the actuator base 49 and valve stem 46 to freely rotate relative to the actuator base 49 and valve stem 46. The third major component of the valve actuator assembly 48 is a lost motion spring mechanism generally designated by the numeral 51 interconnecting the actuator base 49 and the lever assembly 50 for transferring torque from the lever assembly 50 to the actuator base 49, valve stem 46 and valve disc 45 as the lever assembly 50 rotates.

The actuator base 49 includes a hub 52 positioned around valve stem 46 and a base plate 53 projecting radially from the lower end of hub 52. The actuator base 49 is secured to valve stem 46 by a clamping collar or locking assembly 54 which enables torque to be transmitted from the valve stem 46 to the actuator hub 52 while at the same time securing the assembly axially thereon. Thus, the actuator base 49 is directly connected to the butterfly valve stem 46. A valve stem key 55 is utilized to provide proper orientation of the actuator assembly 48 to valve 27. As shown in FIG. 9, the valve stem key 55 does not extend through the locking collar assembly 54, but instead, the valve stem key 55 extends from the bottom of the locking collar 54 to the beginning of the keyway in the stem 46. As noted, the primary function of key 55 is to properly orientate actuator assembly 48 with respect to valve 27 rather than to transmit torque from the lever assembly 50 to the actuator base 49.

Lever assembly 50 includes a collar 56 having a central bore into which is pressed a flanged, self-lubricating bearing 57. Collar 56 with the bearing 57 pressed into position slides over and surrounds the actuator base hub 52 to be positioned against seat 58 formed on hub 52. Lever assembly 50 is free to rotate relative to the actuator base 49 due to bearing 57. A self-lubricating thrust washer 59 is positioned at the top end of the journal bearing 57, and the hub 52 of actuator base 49 extends through the central bore of thrust washer 59. The lever assembly 50 is held axially in place by an end cap 60 that is bolted to the hub 52 of the actuator base 49. The thrust washer 59 is sandwiched between the end cap 60 and the lever assembly 50 so that lever assembly 50 can rotate freely around the actuator hub 52 without excessive looseness. If necessary, shims can be added between the end cap 60 and the actuator base hub 52 to provide necessary axial clearance for free rotation.

Lever assembly 50 also includes a plurality of equi-angularly spaced lever arms 61a–61d projecting radially from collar 56. As shown best in FIG. 8, there are four lever arms 61a–61d disposed 90° apart from one another and each arm 61a–61d is in the form of a flat plate extending radially from the lower edge of collar 56. An L-shaped bracket 62a–62d is connected to the end of each lever arm 61a–61d such that each bracket 62a–62d includes an upright segment 63a–63d extending axially upwardly from the end of arm 61a–61d and a horizontal flat segment 64a–64d extending radially outwardly in the same direction as arm 61a–61d. An upright wall 65a–65d extends between and interconnects the outer circumference of collar 56 with upright segment 63a–63d of each bracket 62a–62d.

Figure 8:
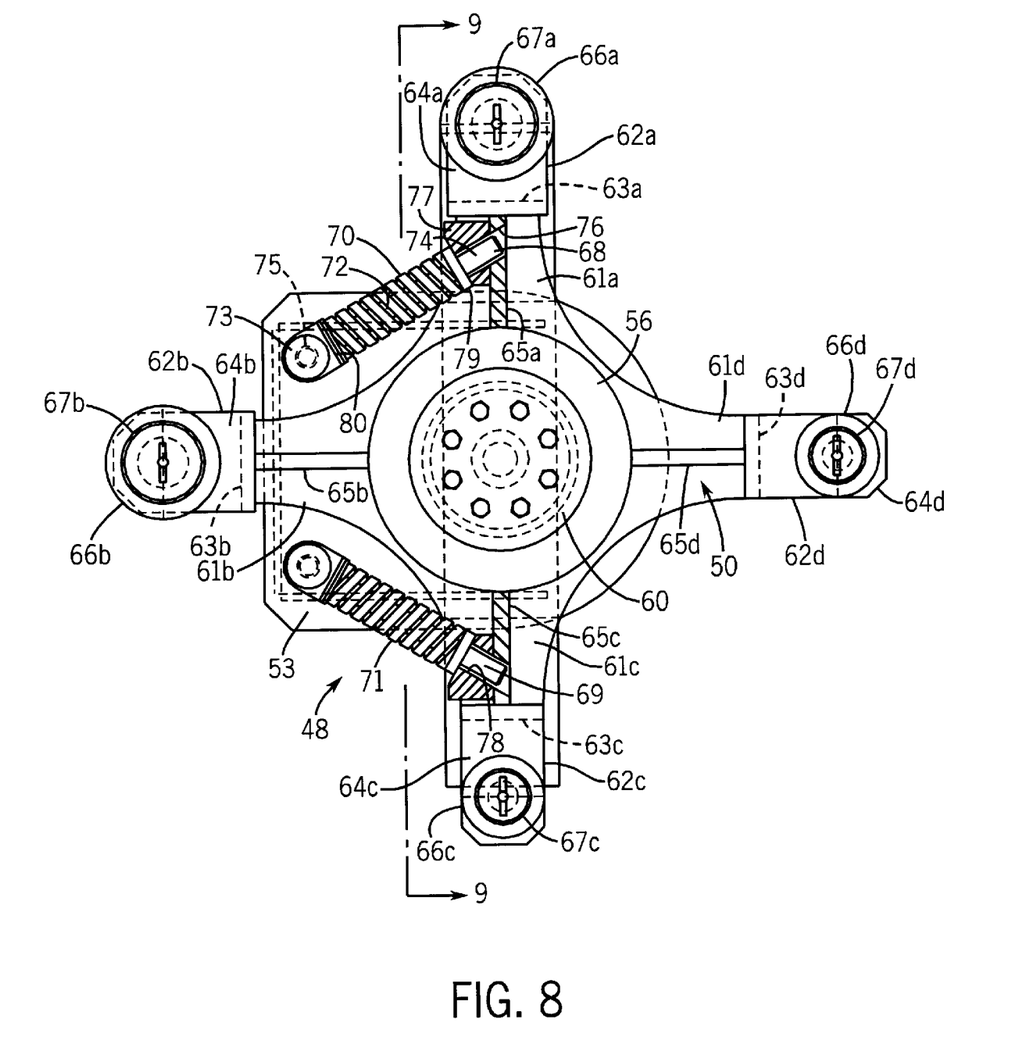
FIG. 8 is an enlarged plan view with parts shown in cross-section of the valve actuation mechanism.

A cam roller 66a–66d is rotatably mounted on each flat segment 64a–64d of bracket 62a–62d about an axis of rotation which is parallel to and radially spaced from the axis of rotation of valve stem 46. Each cam roller 66a–66d is cylindrically shaped and is rotatably mounted about a pin 67a–67d which extends through flat segment 64a–64d. A spacer 81a–81d is used to adjust the height of cam roller 66a–66d so that it properly engages cam tracks 39 or 40. FIGS. 8 and 9 illustrate that there are two sizes of cam rollers. The large rollers 66a and 66b have diameters that are greater than the small rollers 66c and 66d, and are the ones that come in contact with cam tracks 39 and 40 during normal operation. The small rollers 66c and 66d are mounted on the lever arms 61c and 61d respectively that do not actuate the valves 27 under normal operating conditions. The small rollers 66c and 66d are mounted on the lever arms 61c and 61d that actuate valves 27 when the kiln rolls back, as shown in FIG. 6. To reduce wear of parts, small rollers 66c and 66d are used on the rollback levers 61c and 61d to assure that they do not come in contact with the tripper track 39 or 40 during normal operation. If all of the rollers 66a–66d were the same size, one of the rollback rollers, either 66c or 66d would have to deflect each time the actuator mechanism passed by a valve tripper 28 or 29 under normal operating conditions. This would double the wear of the tripper tracks 39 and 40 at the critical point where the proper deflection is necessary to seat discs 45 of valves 27.

Torque is transferred from the lever assembly 50 to the actuator base 49, valve stem 46 and valve disc 45 by the lost motion spring mechanism 51. The lost motion spring mechanism 51 comprises a combination of swing bolts and coil springs interconnecting the lever assembly 50 and the actuator base 49.

As shown best in FIG. 8, the lever assembly 50 and the actuator base 49 are connected by a combination of swing bolts 68 and 69 and coil springs 70 and 71 respectively. Each spring assembly is identical in structure and therefore only need be described hereinafter. More specifically, swing bolt 68 includes a shank 72, a pivot end or head 73 and a free end 74. The pivot end of bolt 68 is pivotally mounted on the actuator base plate 53 about an axis parallel to the axis of rotation of valve stem 46. The pivotal connection of each swing bolt 68 is provided by a pin 75 extending through a bore formed in pivot head 73. The free end 74 of bolt 68 is received within an opening 76 formed in wall 65a. A boss 77 formed on wall 65a reinforces wall 65a, and includes an opening 78 formed therethrough for receiving the free end 74 of bolt 68 to secure free end 74. Coil spring 70 surrounds shank 72 of swing bolt 68 and has one end bearing against a flange 79 formed on shank 72 adjacent free end 74, and its other end bearing against a flat surface 80 formed on pivot head 73. The distance from the flat surface 80 on pivot head 73 to the flange 79 is slightly less than the free length of spring 70 resulting in spring 70 being slightly compressed when actuator assembly 48 is assembled. This slight compression assures that there will always be a desired amount of resistance applied to a cam roller 66a–66d if the lever arm to which it is attached is moved over center as the lever assembly 50 rotates relative to actuator base 49. This resistance produces the closing torque necessary to seat the valve disc 45 in the valve seat of butterfly valves 27.

Once valve disc 45 of butterfly valves 27 comes in contact with its valve seat, it will seal completely over a very short distance of disc movement. The movement can be as small as 1/32 of an inch or 1/4-degree of stem rotation even with a flexible seat. By having two assemblies to the valve actuation mechanism that are connected to one another by springs and can move relative to one another via a lost motion mechanism, sufficient flexibility can be built into the system to accommodate such small movement without over stressing valve parts.

For a seated valve to properly close, a certain amount of torque has to applied to valve stem 46. Most valve manufacturers will specify a range of torque values that will close the valve completely, for example 1,600–5,000 in.-lbs. One of the objects of the present invention is to apply sufficient torque to valve disc 45 to close it completely but to also provide some allowance for misalignment and tolerance build-up in parts. As an example, the dimensions of the actuator components combined with the spring rate should be selected to produce the required torque range over a cam roller deflection of about 1 inch. The closing valve tripper 29 should then be set to produce sufficient cam roller deflection that would develop about 1,800 in.-lbs. of torque to the valve stem 46. This is well within the 1,600–5,000 in.-lbs. range of closing torque recommended by manufacturers. The required cam roller deflection to develop 1,800 in.-lbs. of stem torque would be about 0.25 inches, as shown in FIG. 7. However, maximum allowable applied torque to the valve stem is 5,000 inch pounds. To develop this amount of torque with the same springs and part dimensions, the cam roller would have to deflect the full 1 inch. Therefore, there is a 0.75 inch allowance for misalignment, tolerance build-up and wear.

Referring now to FIG. 4, there is illustrated a valve opening operation for the butterfly valve 27 utilizing the opening valve tripper 28. As previously noted, the opening of valve 27 would occur as the valve 27 passes beneath product bed 11. FIG. 5, on the other hand illustrates the valve closing operation utilizing the closing valve tripper 29. Again, as previously referred to herein, the closing of valve 27 occurs as the valve rotates above product bed 11. Finally, FIG. 6 illustrates a kiln rollback situation. The use of four lever arms 61a–61d allows kiln 1 to rollback or reverse rotate without damaging any valve components or causing valves 27 to get out of sequence. As shown, as the kiln 1 rolls back the second set of lever arms, 61c and 61d engage the tripper track 40 and the action of valve 27 is reversed from a closed position to an open position.

Various alternatives are contemplated as being within the scope of the following claims.

I claim:

1. A butterfly valve for use with an air injection system of a ported rotary kiln, comprising:
a valve housing having an air passageway and including an air inlet and an air outlet;
a valve member rotatable within said housing to open and close said passageway;
a valve stem defining an axis of rotation and connected to said valve member for rotation therewith; and
a valve actuator assembly mounted on said valve stem to rotate said valve member, said valve actuator assembly comprising:
an actuator base connected to said valve stem for rotation therewith;
a lever assembly mounted coaxially with said actuator base and valve stem to freely rotate relative to said actuator base and valve stem; and
a lost motion mechanism interconnecting said actuator base and said lever assembly for transferring torque from said lever assembly to said actuator base as said lever assembly rotates.

2. The butterfly valve of claim 1 wherein said actuator base includes a hub positioned around said valve stem and a base plate projecting radially from said hub.

3. The butterfly valve of claim 1 wherein said lever assembly includes a collar and a plurality of equiangularly spaced lever arms projecting radially from said collar.

4. The butterfly valve of claim 3, wherein there are four lever arms and each of said lever arms includes a cam roller rotatably mounted on an axis of rotation parallel to and radially spaced from the axis of rotation of said valve stem.

5. The butterfly valve of claim 1, wherein said actuator base includes a hub positioned around said valve stem, said lever assembly includes a collar positioned around said hub, and further including a retainer for axially holding said collar on said base while permitting said collar to freely rotate relative to said base.

6. The butterfly valve of claim 5 wherein said retainer comprises an end cap mounted to said hub.

7. The butterfly valve of claim 6 wherein a thrust washer is sandwiched between said end cap and said hub.

8. The butterfly valve of claim 1 wherein said lost motion mechanism comprises at least one spring assembly extending between said actuator base and said lever assembly.

9. The butterfly valve of claim 8 wherein said spring assembly comprises a swing bolt having a shank, a pivot end and a free end, said pivot end being pivotally mounted on said actuator base about an axis parallel to the axis of rotation of said valve stem and said free end being received within an opening formed in said lever assembly, and a coil spring surrounding said shank, said spring being slightly compressed so as to provide a desired amount of resistance to the rotation of said lever assembly relative to said actuator base.

10. The butterfly valve of claim 9 wherein said lever assembly includes at least two lever arms projecting radially in opposite directions and a spring assembly extends between each of said lever arms and said actuator base.

11. The butterfly valve of claim 10 wherein said actuator base comprises a hub connected to said valve stem and a base plate projecting radially from said hub, and the pivot end of each swing bolt is mounted on said base plate.

* * * * *